United States Patent [19]

Ward

[11] 3,810,028

[45] May 7, 1974

[54] WAVESHAPING CIRCUIT AND DEVICES USING SAME

[75] Inventor: Curtis E. Ward, Los Altos, Calif.

[73] Assignee: Varian Associates, Palo Alto, Calif.

[22] Filed: Oct. 10, 1972

[21] Appl. No.: 296,384

[52] U.S. Cl................... 328/142, 307/228, 307/229, 307/310, 328/162, 330/30 D

[51] Int. Cl............................................. H03k 17/00

[58] Field of Search........... 328/142, 162, 186, 330, 328/229; 307/310, 254; 330/30 D, 69

[56] References Cited

UNITED STATES PATENTS

| | | | |
|---|---|---|---|
| 2,909,658 | 10/1959 | Goldman | 328/142 |
| 3,465,168 | 9/1969 | Luhowy et al. | 307/230 |
| 3,293,540 | 12/1966 | Silard et al. | 307/310 |
| 3,179,896 | 4/1965 | Weber | 330/69 |
| 3,435,362 | 3/1969 | Pamleny | 330/69 |

*Primary Examiner*—Rudolph V. Rolinec
*Assistant Examiner*—B. P. Davis
*Attorney, Agent, or Firm*—Stanley Z. Cole; Harry E. Aine; Robert K. Stoddard

[57] ABSTRACT

A waveshaping circuit for producing a non-linear transfer function includes an amplifier having a non-linear negative feedback device, such as a diode, connected for causing the gain of the amplifier to increase with increasing amplitude of the input signal such that the transfer function for the waveshaping circuit is an exponential function where the exponent has a magnitude greater than 1. The output of the non-linear amplifier is fed to the input of a device which it is desired to linearize and which has an exponential transfer function where the exponent is less than 1 such that the combined transfer function for the combined wavehsaping circuit and the device to be linearized has a linear transfer function. The non-linearity of the waveshaping circuit is adjustable by varying the amount of negative feedback. The circuit is temperature compensated by means of a thermistor having a temperature coefficient matched to that of the diode and paralleled with the diode in a differential amplifier circuit.

9 Claims, 6 Drawing Figures

WAVESHAPING CIRCUIT AND DEVICES USING SAME

BACKGROUND OF THE INVENTION

Heretofore, waveshaping circuits have been proposed which have had a non-linear exponential transfer function where the exponent had a magnitude greater than one to compensate for a non-linear transfer function of a device being controlled by the output of the waveshaping circuit. The exponential transfer function of the device being controlled had an exponent less than one such that the combined transfer function for both the waveshaping circuit and the device being controlled was nearly linear.

An example of such a waveshaping circuit is that as disclosed in Electronic Design News of June 1, 1972 titled "Build a High-Accuracy Waveshaping Circuit Using Inexpensive Parts" pages 36–37.

In this prior art waveshaping circuit, a non-linear transfer function was obtained by a network of diodes and resistors arranged such that as the input voltage was increased an increasing number of diodes would become conductive for varying the effective attenuation of the circuit, thereby causing the transfer function to be composed of a number of straight line segments to approximate a smooth exponential curve. However, the curve, with a finite number of diodes and resistors, had a finite number of breakpoints which can be troublesome. More particularly, if the prior art waveshaping circuit were to be utilized for compensating for the non-linear tuning characteristic of a varactor tuned oscillator, the breakpoints would give rise to breaks in the modulation sensitivity at high modulation frequencies.

Thus it is desirable to provide a waveshaping circuit which will provide a smooth exponential transfer characteristic where the exponent is greater than one. It is also desirable to provide such a transfer function which is adjustable merely by varying the setting of a potentiometer or the like such that the non-linearity of the waveshaping circuit is readily adjustable for compensating for variations in the transfer function of devices being compensated.

SUMMARY OF THE PRESENT INVENTION

The principal object of the present invention is the provision of an improved waveshaping circuit and devices using same.

In one feature of the present invention, the waveshaping circuit includes an amplifier having a non-linear negative feedback device connected for causing the gain of the amplifier to increase with increasing amplitude of the input signal applied to the amplifier, whereby the waveshaping circuit is caused to have an exponential transfer function where the exponent has a magnitude greater than one.

In another feature of the present invention, the non-linear negative feedback device in the amplifier of the waveshaping circuit is a solid state diode.

In another feature of the present invention, the amplifier having the non-linear negative feedback device for providing the exponential transfer function comprises a differential transistor amplifier with a diode connected in the emitter circuit of one of the transistor amplifiers to provide the non-linear negative feedback to that amplifier and wherein a temperature compensating resistor is connected in parallel with the diode in the emitter circuit of the second transistor amplifier for cancelling the temperature coefficient of the diode.

In another feature of the present invention, the amount of negative feedback for the waveshaping circuit is variably adjusted by means of a variable resistor connected in shunt with the non-linear negative feedback device, such as a diode.

In another feature of the present invention, the non-linear exponential output of a waveshaping circuit is supplied as the electronic tuning voltage signal to a varactor tuned resonant circuit, such as that of a Gunn oscillator, having a non-linear exponential tuning characteristic such that the combined transfer function for the waveshaping circuit and non-linear tuning circuit is approximately linear.

Other features and advantages of the present invention will become apparent upon a perusal of the following specification taken in connection with the accompanying drawings.

DESCRIPTION OF THE PREFERRED EMBODIMENTS

Figure 1:
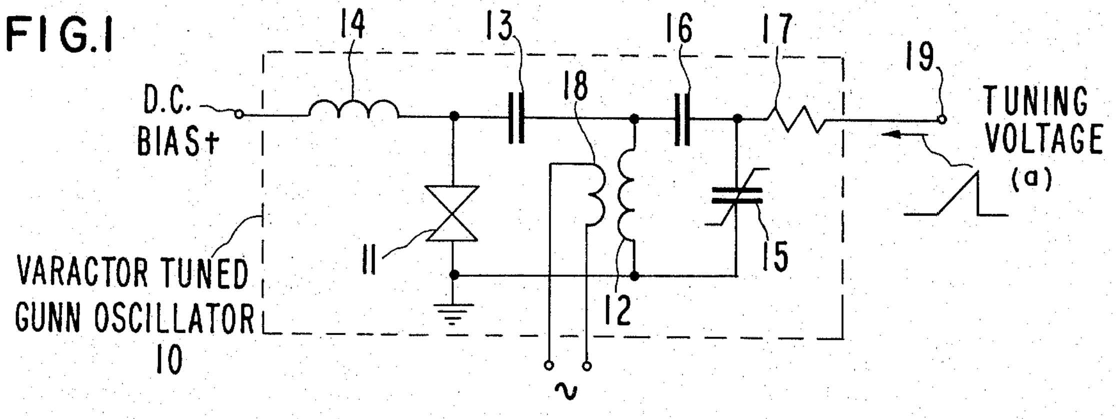
FIG. 1 is a schematic circuit diagram for a varactor tuned Gunn oscillator.

Referring now to FIG. 1, there is shown a varactor tuned Gunn oscillator circuit 10. The circuit 10 includes a Gunn diode oscillator 11 parallel connected with an inductor 12 via a coupling capacitor 13. The DC bias potential is applied to the Gunn diode 11 via the intermediary of an RF choke 14.

A varactor tuning diode 15 is parallel connected with the Gunn diode 11 and inductor 12 via the intermediary of a second coupling capacitor 16. A varactor tuning voltage is applied to the varactor diode 15 via the intermediary of an RF isolating resistor 17. An output coupling loop 18 is inductively coupled to the resonant circuit including the Gunn diode 11 inductor 12 and varactor 15 for coupling out of the resonator output RF energy. The resonant frequency of the Gunn oscillator circuit is tuned by means of a variable varactor tuning voltage, such as waveform (a), applied at terminal 19 for varying the frequency of the resonator and thus the frequency of the Gunn oscillator.

Figure 2:
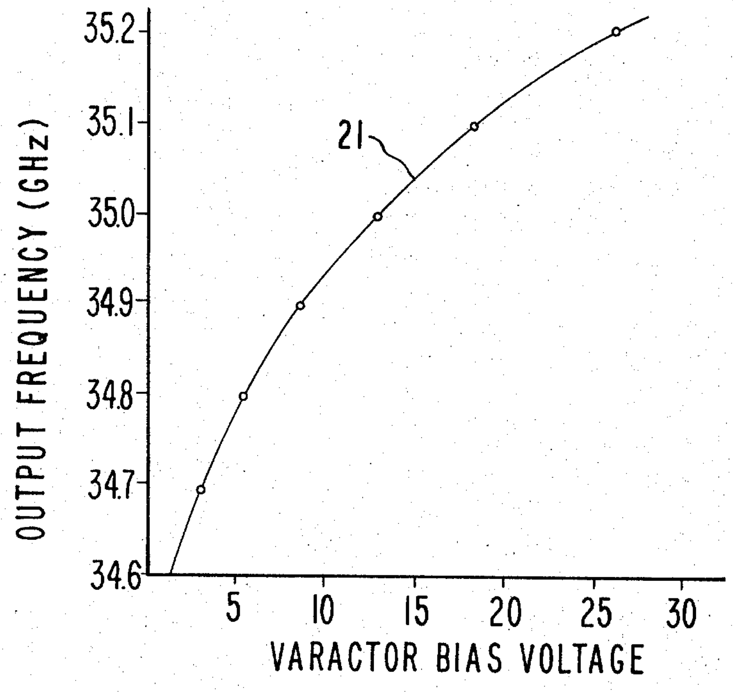
FIG. 2 is a plot of output frequency in gigahertz vs. varactor bias voltage for the circuit of FIG. 1.

Referring now to FIG. 2 there is shown a plot of output frequency in GHz vs. varactor tuning or bias voltage for a typical Gunn oscillator circuit 10. As can be seen by reference to FIG. 2, the output tuning characteristic 21 is non-linear being an exponential function of the varactor bias voltage wherein the exponent is less than one.

Figure 3:
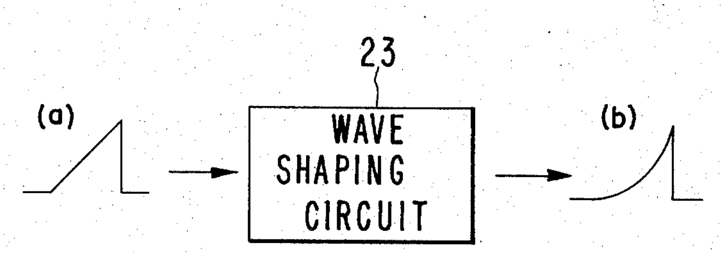
FIG. 3 is a schematic block diagram of a waveshaping circuit having a non-linear exponential transfer function, as shown by the input and output waveforms (a) and (b) respectively.

It would be desirable to have a linear output tuning characteristic such that a certain increment of input tuning voltage always results in the same incremental change in the output frequency regardless of the frequency of the oscillator. This can be obtained if a waveshaping circuit of the type shown in FIG. 3 is employed for deriving the tuning voltage to be applied to the varactor diode 15. More particularly, the waveshaping circuit 23 should have a non-linear exponential transfer function of the type shown in FIG. 4 wherein the exponent has a magnitude greater than one, such that the non-linearity of the transfer function of the waveshaping circuit 23 compensates for the non-linearity of the tuning transfer function of the varactor tuned oscillator. When the output of the waveshaping circuit 23 is utilized as the tuning voltage applied to the varactor tuned oscillator, the combined transfer function for the waveshaping circuit 23 and varactor tuned oscillator 10 is linear as shown in FIG. 5.

Figure 5:
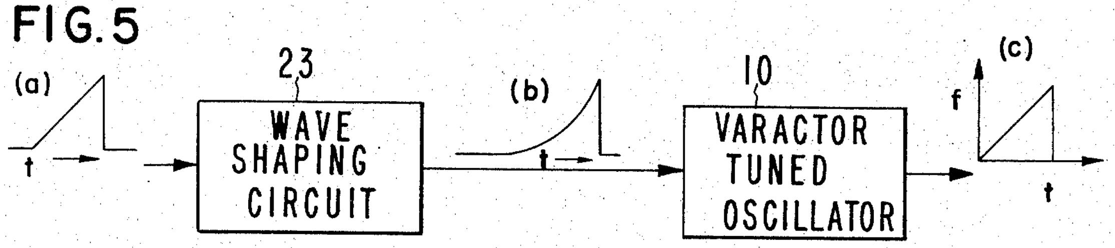
FIG. 5 is a schematic block diagram of a varactor tuned oscillator incorporating the waveshaping circuit of the present invention to provide a linear tuning characteristic.

More particularly, by reference to FIG. 5, a linear input signal (a) produces an output voltage of a waveform as shown by waveform (b) having a gain characteristic which increases with increasing amplitude of the input signal. When the output of the waveshaping circuit 23 has an exponential form with an exponent greater than one and is applied as the input tuning signal to the varactor tuned oscillator 10, the non-linearity of the waveshaping circuit transfer function can compensate for the non-linear exponential tuning characteristic of the varactor tuned oscillator 10, where the exponent of its transfer function has a magnitude less than one, to provide a substantially linear composite transfer function for the composite circuit, as shown by waveform (c).

Figure 6:
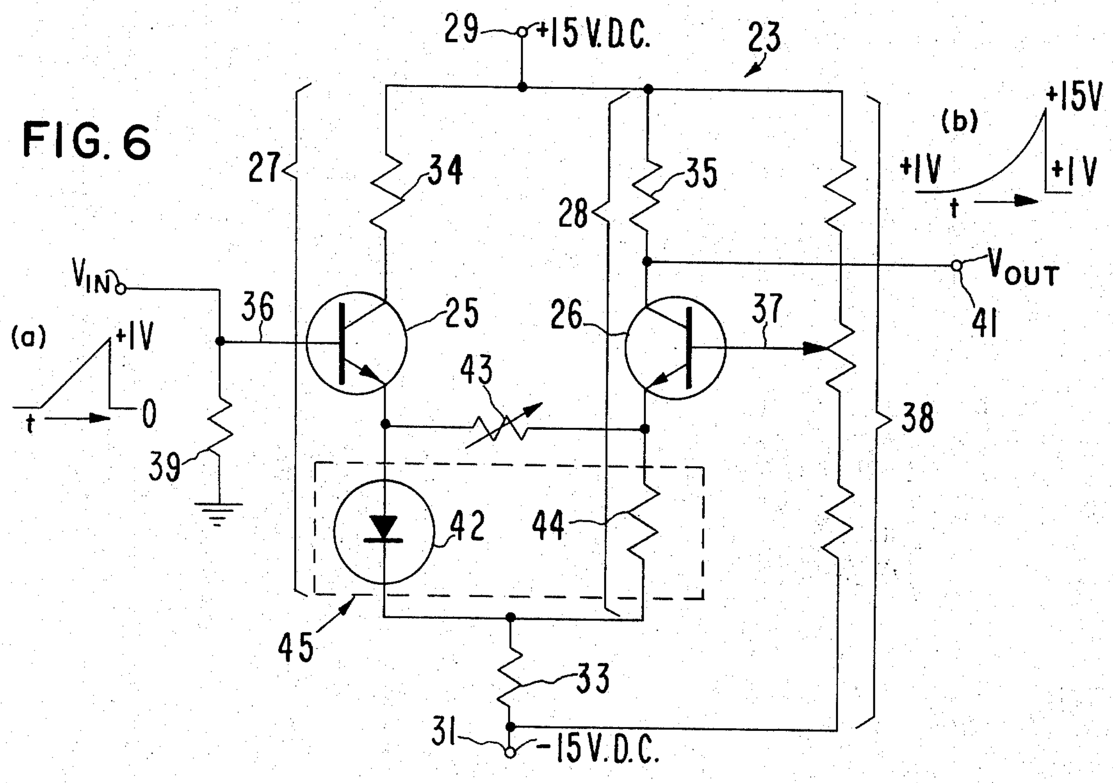
FIG. 6 is a circuit diagram for a waveshaping circuit incorporating features of the present invention.

Referring now to FIG. 6, there is shown a waveshaping circuit 23 having a non-linear exponential transfer function wherein the exponent is greater than one. More particularly, waveshaping circuit 23 includes a differential amplifier consisting of first and second transistors 25 and 26 connected in parallel circuit branches 27 and 28 which in turn are series connected with the +15 and −15 volt DC terminals of a power supply connected across terminals 29 and 31. The parallel circuit branches 27 and 28 are connected together at node 32 which in turn is connected to the negative terminal 31 of the power supply via a common load resistor 33, as of 2 KΩ resistance.

Collector load resistors 34 and 35, as of 2 KΩ each, are connected in the collector circuit of each of the respective transistors 25 and 26 between the respective collector terminals and the positive terminal 29 of the power supply. The base terminals 36 and 37 of transistors 25 and 26, respectively, are connected to their respective input voltages of the differential amplifier circuit.

Base 37 of transistor 26 is connected to a voltage divider 38 connected across terminals 29 and 31 of the power supply for supplying a selected reference input voltage from the voltage divider 38 to the base of the second transistor 26. A variable input voltage is supplied to base 36 of the first transistor 25 via a base to ground resistor 39 as of 1 KΩ resistance.

The reference voltage applied to the base of the second transistor 26 is chosen to establish a quiescent operating point for the differential amplifier such that the current flowing through the second parallel branch 28 is much larger than the current flowing through the first parallel branch 27. More particularly, in a typical example, the reference voltage applied to base 37 is selected such that approximately 7 milliamps of current flows through transistor 26, whereas only 0.5 milliamps flows through the input circuit branch 27 including transistor 25 when zero input voltage is applied to the base 36 of the first input transistor 25.

Thus, in a typical example, the common load resistor 33 has a value of approximately 1,800 ohms and the collector load resistor 35 in the second parallel branch 28 has a resistance of approximately 2 KΩ. The voltage appearing at the collector of the second transistor 26 is approximately 1 volt with 0.1 volts positive with respect to ground applied to the base of transistor 26 from the voltage divider network 38. This establishes approximately −1.5 volts at node 32.

As the input voltage applied to the base 36 of the first transistor 25 increases from approximately zero to +1 volts, this causes the current in the first branch 27 to increase producing a corresponding decrease in the current drawn by the second transistor 26 in the second branch 28, such that the voltage remains substantially constant at −1.5 volts at node 32. This is the conventional mode of operation of a differential amplifier of this type. Decreasing the current in the second branch 28 causes the output voltage appearing at terminal 41 to increase from approximately 1.0 volts to a maximum of +15 volts, the potential applied to the positive terminal 29.

A non-linear negative feedback device, namely, diode 42 is connected in the first parallel branch 27 between the emitter of transistor 25 and node 32. Diode 42 is polarized for conduction away from the emitter terminal of transistor 25 such that the voltage drop across the diode 42 is a non-linear exponential function of the applied current. More particularly, the voltage drop across diode 42 serves as negative feedback in the amplifier circuit and the negative feedback, as a percent of the input, decreases with increasing amplitude of the current, i.e. increasing magnitude of the input voltage applied to base 36 of the first input transistor 25. This causes the gain of the composite differential amplifier circuit 23 to increase with increasing magnitude of the input signal applied to the first transistor 25. In other words, the transfer function for the differential amplifier circuit 23 is a non-linear exponential function where the exponent has a magnitude greater than one as typified by the curves of FIG. 4. These curves have the proper shape for compensating for a non-linear exponential transfer function of the device being tuned, controlled, or corrected where the exponent has a magnitude less than one, as previously described with regard to FIGS. 1–5.

Figure 4:
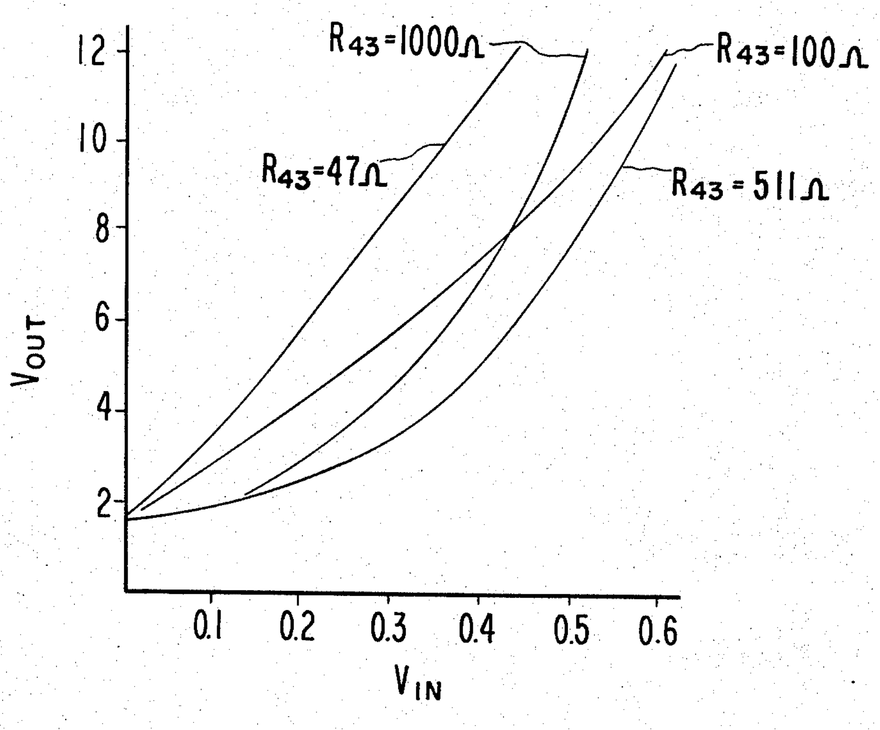
FIG. 4 is a plot of output voltage vs. input voltage depicting the transfer function of the waveshaping circuit of FIG. 3 for various values of negative feedback.

A variable resistor 43 is connected in shunt with the diode 42 for varying the effective value of the negative feedback voltage derived across diode 42, such that the curvature of the transfer function for the differential amplifier 23 may be varied by varying the value of resistor 43. The curves of FIG. 4 show that the effective gain of the amplifier increases in one example, for resistor 43 set at 1 KΩ, from a value of approximately 3 to a value of approximately 52 over the dynamic range of the amplifier. Thus, resistor 43 is variable for varying the curvature of the transfer function to more nearly match the opposite curvature of the transfer function of the controlled or corrected device such as the varactor tuned oscillator 10 to be linearized.

A temperature dependent resistor 44 of a value of resistance and temperature coefficient approximately equal to that of the diode 42 is connected in the second parallel branch 28 between the emitter of the second transistor 26 and node 32 for compensating for the termperature coefficient of the diode 42 to render the differential amplifier insensitive to temperature variation. The diode 42 and resistor 44 are preferably potted together in a thermally conductive potting material indicated at 45 such that both diode 42 and resistor 44 are exposed to the same temperature environment. In a typical example, the potting material consists of an epoxy binder loaded with thermally conductive insulative particles such as $B_eO$ particles or alumina flakes. Such potting material is available from Wakefield Engineering as Delta Bond 152 potting compound.

Although, thusfar, the waveshaping circuit 23 of FIG. 6 has been shown as utilized for compensating for the non-linear tuning characterisitics of a varactor tuned Gunn oscillator, this circuit may be utilized to linearize the transfer function of many other devices, such as magnetically tuned resonant circuits, varactor tuned resonant circuits, magnetic field regulators, and the like.

What is claimed is:

1. In a waveshaping circuit for producing a non-linear transfer characterisitic:

amplifier means having input and output signal means for applying an input signal to said input terminal means to produce an amplified output signal at said output terminal means;

non-linear negative feedback means connected in said amplifier means for causing the gain of said amplifier to increase with increasing amplitude of said input signal, whereby the waveshaping circuit is caused to have a non-linear exponential transfer function characterized by the output being an exponential function of the magnitude of the input where the exponent has a magnitude greater than one and further including means for shunting a variable selectable amount of current around said feedback means for varying the non-linear transfer function of the waveshaping circuit.

2. The apparatus of claim 1 wherein said non-linear negative feedback means comprises a solid state diode.

3. The apparatus of claim 2 wherein said amplifier is a differential amplifier having first and second transistors with their respective collector-to-emitter circuits connected in first and second parallel circuit branches, means for applying a potential in series with said parallel connection of said first and second circuit branches and having positive and negative terminals to which the respective positive and negative terminals of a source of potential are to be applied, said negative feedback diode being connected in said first parallel circuit branch between the emitter terminal of said first transistor and the negative terminal of said potential applying means, and said diode being polarized for conduction of current away from said emitter terminal of said first transistor.

4. The apparatus of claim 2 wherein said shunting means includes a variable resistor connected in parallel with said diode.

5. The apparatus of claim 3 including a temperature dependent resistor having a temperature coefficient approximately equal to that of said diode connected in said second parallel circuit branch between the emitter terminal of said second transistor and said negative terminal of said potential applying means for temperature compensating said diode.

6. The apparatus of claim 5 wherein said temperature dependent resistor is a thermistor.

7. The apparatus of claim 3 including, a load resistor connected in said parallel circuit branch between the collector terminal of said second transistor and the positive terminal of said potential applying means, and wherein said output terminal of said differential amplifier means is connected in said second parallel circuit branch between said load resistor and said collector terminal of said second transistor.

8. The apparatus of claim 1 including, resonator means defining a resonant circuit to be tuned, said resonator means including a voltage variable capacitor portion for electronic tuning of said resonator means in response to a tuning voltage applied to said voltage variable capacitor, said resonator means having a non-linear resonant frequency vs. tuning voltage transfer function characterized by a resonant frequency which is related to the magnitude of the tuning voltage taken to the power of a second exponent having a magnitude less than one and wherein the non-linear output of said amplifier means is employed as said tuning voltage for electronic tuning of said resonator means, whereby the non-linear transfer function of said amplifier compensates for the non-linear tuning characteristic of said resonator means.

9. The apparatus of claim 1 including, second means having a non-linear transfer function characterized by the output being a function of the input taken to the power of a second exponent having a magnitude less than one, and wherein the non-linear output of said amplifier means is employed as the input of said second non-linear means, whereby the non-linear transfer characteristic of said amplifier means compensates for the non-linear transfer characteristic of said second non-linear means.

* * * * *